US007864931B2

(12) United States Patent
Stillman et al.

(10) Patent No.: US 7,864,931 B2
(45) Date of Patent: *Jan. 4, 2011

(54) PERSONAL CALENDARING, SCHEDULES, AND NOTIFICATION USING DIRECTORY DATA

(76) Inventors: Scott T. Stillman, 214 Chattan Trail, Peachtree City, GA (US) 30269; John Jeffrey Decker, 2728 Hunting Hill La., Decatur, GA (US) 30033

( * ) Notice: Subject to any disclaimer, the term of this patent is extended or adjusted under 35 U.S.C. 154(b) by 1184 days.

This patent is subject to a terminal disclaimer.

(21) Appl. No.: 11/500,598

(22) Filed: Aug. 8, 2006

(65) Prior Publication Data
US 2007/0121880 A1 May 31, 2007

Related U.S. Application Data

(63) Continuation of application No. 10/393,055, filed on Mar. 20, 2003, now Pat. No. 7,167,547.

(51) Int. Cl.
*H04M 1/64* (2006.01)
(52) U.S. Cl. ............ 379/88.18; 379/88.23; 379/201.02; 379/211.01; 380/277; 709/203; 709/219; 709/225; 709/227; 709/238
(58) Field of Classification Search .............. 379/88.18, 379/88.23, 201.03, 218.01, 201.02, 211.01; 455/403, 412.1; 709/204, 203, 219, 225, 709/227, 238, 246; 380/277
See application file for complete search history.

(56) References Cited

U.S. PATENT DOCUMENTS

| 5,245,719 | A | 9/1993 | Ott | 632/630 |
|---|---|---|---|---|
| 6,373,817 | B1 | 4/2002 | Kung et al. | 370/217 |
| 6,430,405 | B1 * | 8/2002 | Jambhekar et al. | 455/403 |
| 6,480,711 | B1 * | 11/2002 | Guedalia | 455/412.1 |
| 6,480,830 | B1 | 11/2002 | Ford et al. | 705/9 |
| 6,687,362 | B1 | 2/2004 | Lindquist et al. | 379/218.01 |
| 6,731,732 | B2 * | 5/2004 | Creamer et al. | 379/201.03 |
| 6,813,348 | B1 | 11/2004 | Stillman et al. | 379/221.08 |
| 6,823,373 | B1 * | 11/2004 | Pancha et al. | 709/219 |
| 7,167,547 | B2 * | 1/2007 | Stillman et al. | 379/88.23 |
| 7,506,063 | B2 * | 3/2009 | Berg | 709/238 |
| 7,526,572 | B2 * | 4/2009 | Omar et al. | 709/246 |
| 7,546,369 | B2 * | 6/2009 | Berg | 709/227 |
| 7,606,898 | B1 * | 10/2009 | Hunt et al. | 709/225 |
| 7,640,298 | B2 * | 12/2009 | Berg | 709/203 |
| 7,721,210 | B2 * | 5/2010 | Mansikkaniemi et al. | 715/733 |

(Continued)

OTHER PUBLICATIONS

U.S. Appl. No. 10/033,627, filed Dec. 27, 2001, 33 pages.

*Primary Examiner*—Gerald Gauthier
(74) *Attorney, Agent, or Firm*—Woodcock Washburn LLP

(57) ABSTRACT

Methods and systems are provided for utilizing calling party personal calendaring and scheduling information to facilitate enhanced directory assistance information. After obtaining a directory number for a called party from a subscriber's address book or from a directory assistance service, a voice services node queries a personal scheduling calendar of the called party to determine whether the called party is currently located at a location other than the location accessible by the obtained directory number. If so, the voice services node may obtain an alternate directory number for the current location of the called party, and the voice services node may automatically place a call to the called party via the alternate directory number or provide the alternate directory number to the subscriber.

50 Claims, 5 Drawing Sheets

U.S. PATENT DOCUMENTS

| | | | |
|---|---|---|---|
| 7,742,605 B2 * | 6/2010 | Hornak | 380/277 |
| 7,752,331 B2 * | 7/2010 | Grason et al. | 709/238 |
| 2002/0188680 A1 * | 12/2002 | McCormack et al. | 709/204 |
| 2003/0005150 A1 | 1/2003 | Thompson et al. | 709/238 |
| 2003/0043986 A1 | 3/2003 | Creamer et al. | 379/201.03 |
| 2003/0131023 A1 | 7/2003 | Bassett et al. | 707/200 |
| 2003/0179864 A1 | 9/2003 | Stillman et al. | 379/88.18 |
| 2003/0179866 A1 | 9/2003 | Stillman et al. | 379/88.19 |
| 2004/0003048 A1 | 1/2004 | Stillman et al. | 709/207 |
| 2004/0156491 A1 | 8/2004 | Reding et al. | 379/201.02 |

* cited by examiner

PERSONAL CALENDARING, SCHEDULES, AND NOTIFICATION USING DIRECTORY DATA

CROSS-REFERENCE TO RELATED APPLICATIONS

This patent application is a continuation of U.S. patent application Ser. No. 10/393,055, now U.S. Pat. No. 7,167,547, entitled "PERSONAL CALENDARING, SCHEDULES, AND NOTIFICATION USING DIRECTORY DATA," filed Mar. 20, 2003 and assigned to the same assignee as this application. The aforementioned patent application is expressly incorporated herein by reference.

TECHNICAL FIELD

This invention relates to methods and systems for utilizing calling party personal calendaring and scheduling information to facilitate enhanced directory assistance information.

BACKGROUND

With the advent of modern telecommunications systems, users of telephonic systems including wireline and wireless telephones, pagers and the like, are contacted via an address consisting of a directory number. A directory number is generally a number that is dialed or input by an originating party at an originating station to reach a terminating station associated with the directory number. A directory number, typically a ten digit number, is commonly referred to as a "telephone number" and may be assigned to a specific telephone line. In order to contact a user at her telephone or pager, the directory number assigned to the user's telephone, pager, or telephone line is dialed by a calling party using the calling party's telephone, pager, or other telephonic device.

Given the enormous number of telecommunications systems, users and associated directory numbers, a number of telecommunications service provider and third party service provider directory assistance services have been developed. A typical directory assistance service includes a large database containing the names, addresses, and directory numbers for a number of telecommunications systems subscribers. According to a common practice, a user desiring the directory number of another party dials a directory assistance access code, for example "411", to be connected to a local or third party directory assistance service. Once connected to the service, the user may provide the name and/or address associated with the requested directory number to a human operator or to a voice activated directory assistance system. If the requested directory number is located, the number is provided to the user by the operator or via a recorded message file. Often, the provision of the directory number is accompanied by an offer to automatically connect the user to the requested directory number. Unfortunately, under such systems, the user must memorize the directory number for future use, manually record the directory number for future use, or the user must call back to the directory assistance service each time the user needs the requested directory number.

Some prior telecommunications systems allow user's to establish address books in a local or remote database where a number of directory numbers may be saved for use by the user. The user may select directory numbers from the user's personal address book, or by using a voice activated dialing system a user may be automatically connected to a called party whose number is in the user's address book. Unfortunately, if a desired called party's directory number is not in the user's personal address book, the user must disconnect the call and place a second call to a directory assistance service. After the user finally gets a directory number from directory assistance, the user must memorize the number, record the number or call back to directory assistance for subsequent use of the number. If the user wants to add the new number to her personal address book, the user must contact her service provider and manually update her address book with the new number.

If the user accepts an automatic connection offer, a call is placed between the user and the called party via the requested directory number (either from directory assistance or from the user's personal address book). Unfortunately, once the call is initiated, the directory assistance service or voice activated dialing system typically drops out of the call. That is, the directory assistance service does not stay in the call to monitor whether the user reaches the called party. If the called party is not at the destination associated with the requested directory number, the user's call may go unanswered or the user's call may be forwarded to a voice mail system or other forwarding number. Unfortunately, if the user must reach the called party, the user must now try to ascertain the current location of the called party. For example, the called party may be available via her wireless telephone or pager, or the called party may be at some other location such as an office or vacation destination. If the user can ascertain the current location of the called party, the user must call back to the directory assistance service to obtain a directory number, if available, associated with the current location of the called party.

It is with respect to these and other considerations that the present invention has been made.

SUMMARY

Embodiments of the present invention solve the above and other problems by providing methods and systems for utilizing calling party personal calendaring and scheduling information to facilitate enhanced directory assistance information. Generally described, a subscriber requests directory assistance via a voice interactive system, such as a voice services node. After the subscriber submits a name and/or address to the voice services node, the voice services node queries a subscriber's electronic address book to determine whether a directory number associated with the request is present in the subscriber's address book. If a directory number associated with the request is in a subscriber's address book, the number may be provided to the subscriber, and if desired, a call between the subscriber and a called party associated with the requested directory number may be automatically placed for the subscriber.

If a directory number associated with the requested directory assistance is not in the subscriber's address book, the voice services node may play a prompt to the subscriber asking the subscriber whether additional directory assistance is required. If the subscriber desires additional directory assistance, the voice services node initiates a call to a directory assistance service of the subscriber's telecommunications service provider or of a third party directory assistance provider. After a directory number is obtained from the directory assistance service, the voice services node records the number, performs digit recognition on the number and queries a customer profile database to determine whether a customer profile associated with the subscriber is established. If no customer profile is established for the subscriber, then no address book will be established and, consequently, no attempt will be made to store the obtained number. The subscriber may be prompted to establish a customer profile and address book. If not, the directory number may be provided to the subscriber, and if desired, a call may be automatically placed for the subscriber to the called party via the directory number provided to the subscriber.

If a customer profile is established in the customer profile database for the subscriber, the voice services node may prompt the subscriber to determine whether the obtained directory number should be added to a subscriber's address book. If not, the number may be provided to the subscriber, and if desired, a call may be automatically placed for the subscriber to a called party via the obtained directory number. If the subscriber would like to have the obtained number added to a subscriber's address book, the directory number, name and address associated with the requested directory assistance is added to the subscriber's address book for future use by the subscriber when the subscriber needs the directory number associated with the requested directory assistance. After the directory number, name and address associated with the requested directory assistance is added to the subscriber's address book, the number may be provided to the subscriber to allow the subscriber to dial the called party via the obtained directory number. Alternatively, if desired, a call may be automatically placed to the called party for the subscriber via the obtained directory number.

Whether or not the obtained directory number is added to the subscriber's address book, if any, according to embodiments of the present invention, the voice services node queries a customer profile database to determine whether the obtained directory number (either from the subscriber's address book or from directory assistance) is associated with a second telecommunications services subscriber for which information may be obtained from the customer profile database. If not, the obtained directory number may be provided to the subscriber for connection of the call to the called party. If the obtained directory number is associated with a second subscriber for which information is present in the customer profile database, the voice services node may offer a variety of call processing choices to the subscriber.

The voice services node may check the personal calendar of the called party to determine whether the called party is currently located at a location other than the location accessible by the obtained directory number. If so, according to one aspect of the invention, the voice services node may obtain an alternate directory number for the current location of the called party, and the voice services node may automatically place a call to the called party via the alternate directory number. Alternatively, the voice services node may provide a message to the subscriber to notify the subscriber that the called party is currently located at an alternate location and may be reached at an alternate directory number. The voice services node may provide the alternate directory number to the subscriber, and if desired, the voice services node may automatically place a call to the called party via the alternate directory number. According to another aspect of the invention, the voice services node may prompt the subscriber to determine whether the subscriber would like to add the alternate directory number to the subscriber' address book. If desired, a notification may be sent by the voice services node to the called party that either or both of his/her directory number and/or alternate directory number have been obtained by the subscriber and have been added to the subscriber's address book.

These and other features, advantages and aspects of the present invention may be more clearly understood and appreciated from a review of the following detailed description of the disclosed embodiments and by reference to the appended drawings and claims.

DETAILED DESCRIPTION

Figure 1:
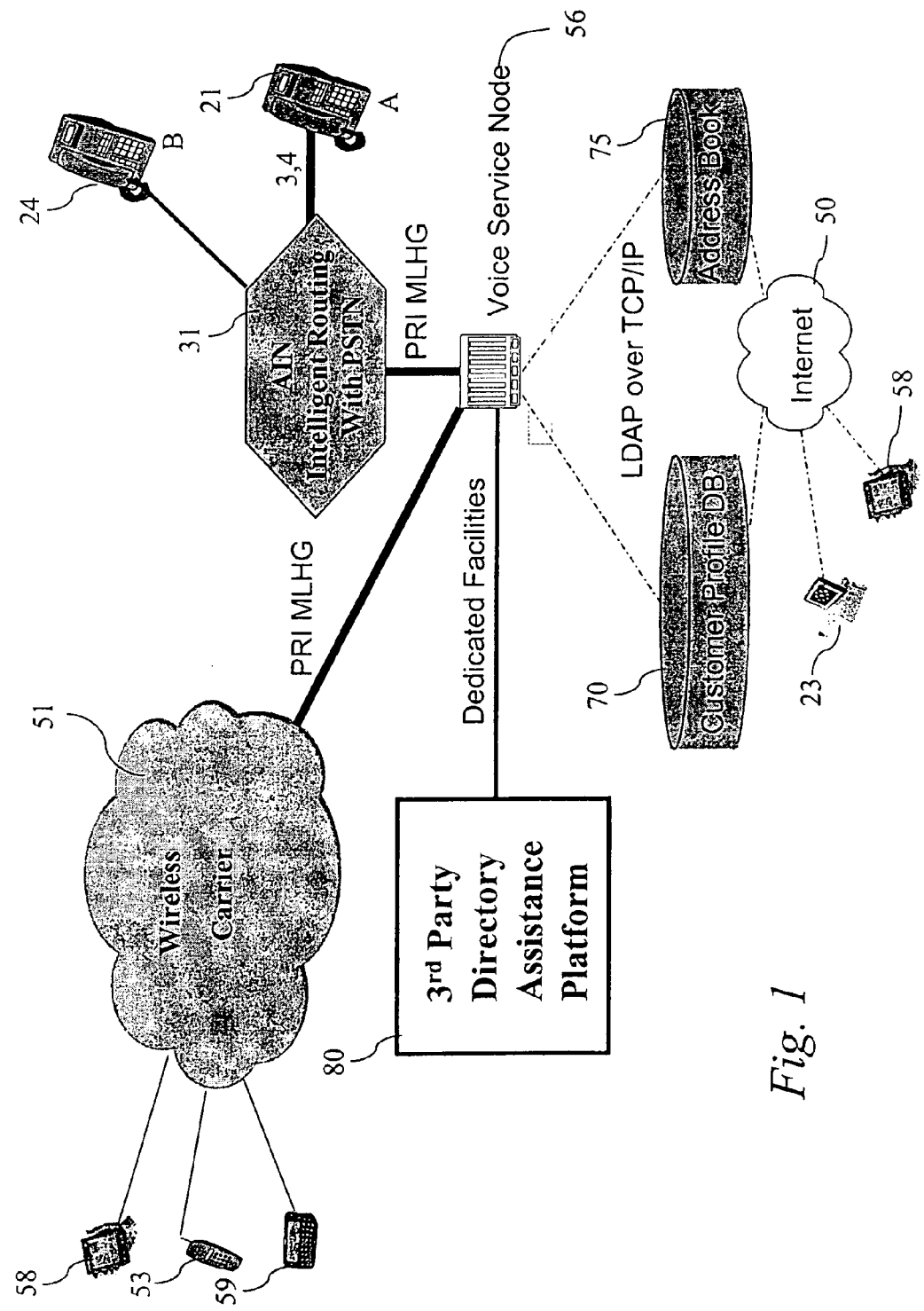
FIG. 1 is a simplified block diagram illustrating components of a wireline and wireless communications network and illustrating interaction between a voice services node and a customer profile database and subscriber address book.

As briefly described above, embodiments of the present invention provide methods and systems for utilizing calling party personal calendaring and scheduling information to facilitate enhanced directory assistance functionality. These embodiments may be combined, other embodiments may be utilized, and structural changes may be made without departing from the spirit and scope of the present invention. The following detailed description is, therefore, not to be taken in a limiting sense, and the scope of the present invention is defined by the pending claims and their equivalents. Referring now to the drawings, in which like numerals refer to like components or elements throughout the several figures, aspects of the present invention and an exemplary operating environment will be described.

FIG. 1 is a simplified block diagram illustrating components of a wireline and wireless communications network and illustrating interaction between a voice services node and a customer profile database and subscriber address book. As described in further detail below, according to embodiments of the present invention, a telecommunications services subscriber desiring directory assistance for a party to whom the subscriber wishes to place a call accesses a voice services node 56 from her telephone 21 or 24 via a public switched telephone network 31. Alternatively, the subscriber accesses the voice services node 56 via a wireless device 53, 58, 59 via a wireless network 51. After receiving a voice prompt from the voice services node, the subscriber speaks the name and/or address of the party with whom the subscriber requests connection. The voice services node 56 queries an address book 75 to determine whether the subscriber has an address book, and if so, whether a directory number for the called party has been previously stored to the subscriber's address book. If the subscriber has an address book at the address book 75, and if the requested directory number is in the address book, the requested directory number may be returned to the subscriber, and if desired, the voice services node may automatically facilitate a connection between the subscriber and the called party via the obtained directory number. If the obtained directory number is not located in an address book for the subscriber, the voice services node 56 connects the subscriber to a directory assistance service 80 that is either operated by the telecommunications service provider operating the voice services node or by a third party.

According to an embodiment of the present invention, prior to providing an obtained directory number to the subscriber, the voice services node 56 queries the customer profile database 70 to determine whether the requested directory number is associated with a second subscriber for whom a customer profile is maintained in the customer profile database 70. If not, the first obtained directory number is provided to the subscriber, and if desired, the voice services node 56 initiates a call between the subscriber and the called party via the first obtained directory number. If the customer profile database 70 does contain a customer profile associated with the requested directory number, the voice services node 56 may check the personal calendaring and scheduling information, if any, for the second subscriber associated with the requested directory number.

If the personal calendaring and scheduling information for the second subscriber indicates that the second subscriber (called party) is currently at a location different from a location associated with a first obtained directory number, the voice services node may query the customer profile for the second subscriber to determine whether an alternate directory number is associated with a wireline or wireless telephone, pager, personal digital assistant, or the like through which the second subscriber (called party) may be reached. For example, the personal calendaring and scheduling information for the called party may indicate that the called party is currently on vacation, and a wireless telephone number may be provided. Accordingly, the voice services node 56 may return an alternate telephone directory number of the wireless telephone to the subscriber instead of returning the first directory number obtained for the called party. If desired, the voice services node may initiate a call automatically between the subscriber and the called party via the alternate directory number. In accordance with embodiments of the present invention, the subscriber avoids calling or being automatically connected to a first directory number for the desired called party where the called party may not be reached via the first directory number. The subscriber receives an alternate directory number at which the called party may potentially be reached based on personal calendaring and scheduling information provided to the customer profile database 70 by the second subscriber or called party.

Operating Environment

Figure 2:
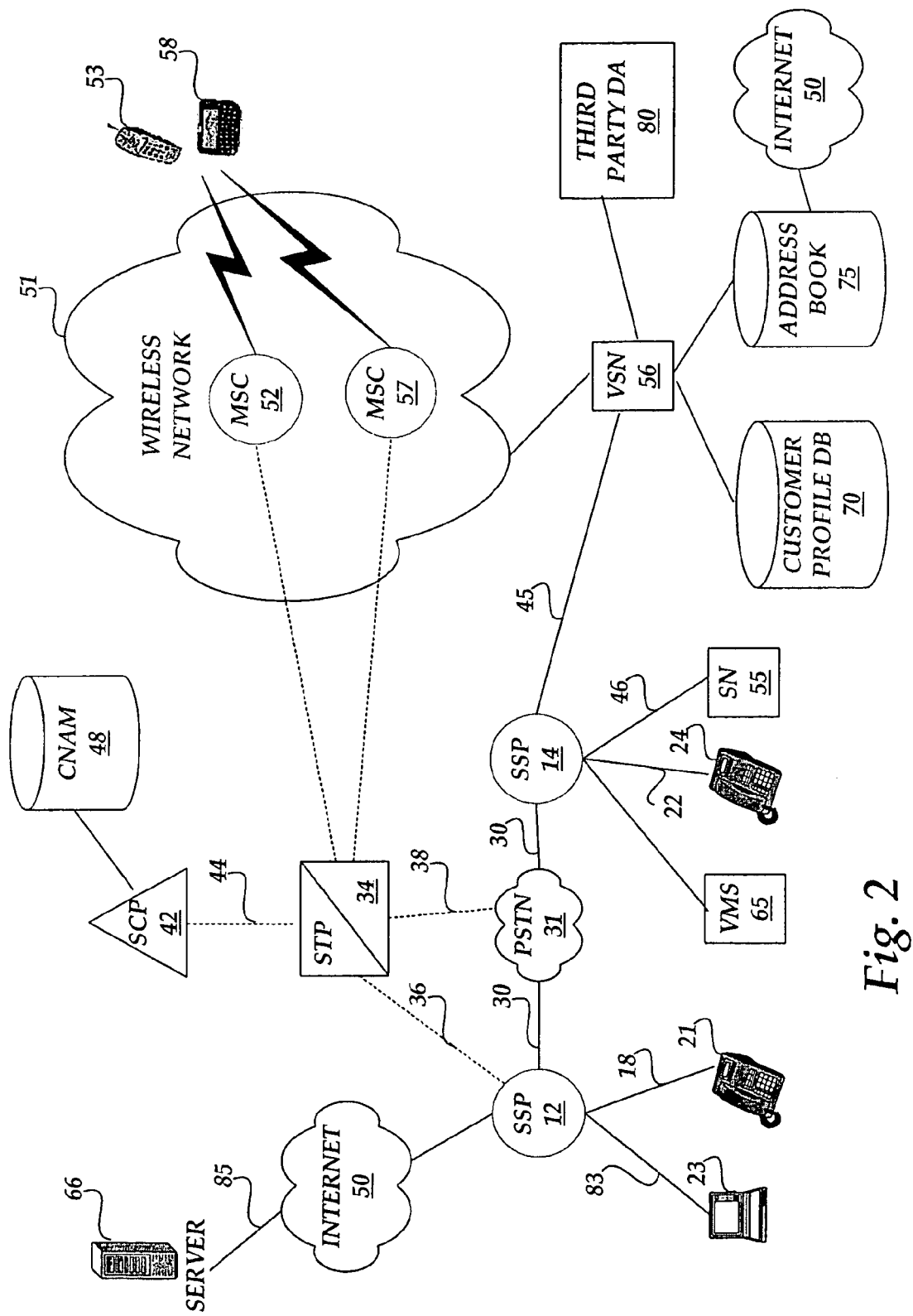
FIG. 2 is a simplified block diagram illustrating components of a wireline and wireless communications network that provides an exemplary operating environment for the present invention.

FIG. 2 is a simplified block diagram illustrating components of a wireline and wireless communications network that provides an exemplary operating environment for the present invention. FIG. 2 and the following description is intended to provide a brief, general description of a suitable operating environment in which the embodiments of the invention may be implemented. While the invention may be described in the general context of software program modules that execute in conjunction with an application program that runs on an operating system of a computer, those skilled in the art will recognize that the invention may also be implemented in a combination of other program modules. Generally, program modules include routines, programs, components, data structures and other types of structures that perform particular tasks or implement particular abstract data types. Moreover, those skilled in the art will appreciate that the invention may be practiced with other telecommunication system and computer system configurations, including hand-held devices, multi-processor systems, multi-processor based or programmable consumer electronics, mini computers, mainframe computers, and the like. The invention may also be practiced in a distributed computing environment where tasks are performed by remote processing devices that are linked through a communications network. In a distributed computing environment, program modules may be located in both local and remote memory sources devices.

The public switched telephone network 31 that evolved in the 1980s incorporated the advanced intelligent network (AIN). Some of the components of the advanced intelligent network are illustrated in FIG. 2. FIG. 2 is illustrative of at least a part of the advanced intelligent network (AIN) 100 of a typical local exchange carrier integrated with components of a wireless network 51. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices is provided in a typical public switched telephone network. As shown in FIG. 2, each central office may include an electronic switch known to those skilled in the art as a service switching point (SSP). These are indicated in FIG. 2 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30.

As shown in FIG. 2, switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. A computer 23 also is illustrated as connected to the switch 12 via the subscriber line or CTI 83. The computer 23 is illustrative of a single or a plurality of computing and data storage devices. SSP switches 12 and 14 are connected by a plurality of trunk circuits 30. These are the voice path trunks that interconnect the central offices 12 and 14 and over which calls are connected when completed.

Each piece of terminating equipment in the PSTN 31 is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local service control point (SCP) 42 that is connected to signal transfer point 34 via SS7 data link 44. As is known to those skilled in the art, service control points, such as the SCP 42, are physically implemented by relatively powerful fault tolerant computers. Among the functions performed by the service control points is maintenance of network databases used in providing enhanced services. Service control points, such as SCP 42, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

Additional devices for implementing advanced network functions within the AIN are provided by regional STPs (not shown) and regional SCPs (not shown). The STP 34 is connected to the SSPs via connections 36 and 38. Both the regional SCPs and the local SCP 42, which represent a plurality of local SCPs distributed throughout the AIN, are connected via respective data links to the service management system (not shown). 46 service management systems provide a centralized platform for remotely programming the various SCPs of the AIN so that a coordinated information processing scheme may be implemented for the AIN.

The modern Advanced Intelligent Network also includes service nodes (SN) 55. Those skilled in the art are familiar with service nodes, which are physically implemented by the same types of computers that embody the SCP 42. In addition to the computing capability and data base maintenance features, service nodes 55 use ISDN lines and may include DTMF signal recognition devices, tone generation devices, text to speech (TTS) voice synthesis devices and other voice or data resources. As shown in FIG. 1, the connection is through the SSP. For example, SN 55 is connected to SCP 42 via ISDN links 46 to SSP 14, ISDN/SS7 protocol conversion in SSP 14, and SS7 links 38 and 44. According to a preferred embodiment, the ISDN links 46 serve as a primary rate interface (PRI) over which services may be provided to subscribers using wireline services such as the wireline telephone sets 21 and 24 and subscribers using wireless services such as the wireless units 53, 58.

The voice services node (VSN) 56 performs the same functions as the service node 55, but also includes voice/speech recognition capability for receiving, processing and handling incoming calls based on speech-based information, commands and instructions provided by callers. Voice/speech recognition utilizes speech enabled telephony. In "speech enabled" telephony systems callers may talk, not dial. For example, according to a voice activated dialing system, a caller may speak the words "Call Joe." According to embodiments of the present invention described below, the VSN 56 places a call to the desired called party. Speech enabled telephony makes use of speech recognition and text-to-speech conversion in order to talk to callers. VSNs 56 may find phone numbers, dial them, read a caller her voice and email messages, allow the caller to respond and then send a caller a message over the Internet or over her corporate intranet. Speech enabled telephony allows a subscriber to call the VSN 56 to obtain (hear) information specific for the subscriber.

Voice recognition via the VSN 56 also includes the ability of a machine to recognize a subscriber's voice. Voice recognition includes the ability of a machine to understand human speech particular to a subscriber. Isolated word and phrase recognition is used in which a VSN 56 is trained to recognize a discrete set of command words or phrases and to respond appropriately. Connected word recognition is used in which a VSN 56 is trained on a discrete set of vocabulary words (for example, digits), but is required to recognize fluent sequences of these words such as credit card numbers. Continuous speech recognition is used in which a VSN 56 is trained on a discrete set of subword vocabulary units (e.g., phonemes), but is required to recognize fluent speech.

A speech recognition system usually is made up of an input device, a voice board that provides analog-to-digital conversion of the speech signal, and a signal processing module that takes digitized speech samples and converts them into a series of patterns. These patterns are then compared to a set of stored models that have been constructed from the knowledge of acoustics, language, and dictionaries. The technology may be speaker dependent (trained), speaker adaptive (improves with use), or fully speaker independent. In addition features such as barge-in capability, which allows the user to speak at anytime, and key word spotting, which makes it possible to pick out key words from among a sentence of extraneous words, enable the development of more advanced applications.

According to embodiments of the present invention, the VSN 56 also includes general computing functionality including a computer processor and associated memory for running one or more software applications or software modules described herein and for storing associated data. According to embodiments of the present invention, the VSN 56 is operative to send database queries to the customer profile database 70 and to the address book database 75 via well known data transmission protocols, including TCP/IP. The VSN 56 may receive and process return data from those databases. Additionally, as with the SN 55, the VSN 56 may route calls within the telecommunications network in which the VSN 56 resides, as well as, send and receive calls. The VSN 56 is further operative to send and receive data through a distributed computing network, such as the Internet 50, to a variety of remote data storage mediums and local and remote information resource providers such as may be available at the server 66.

The customer profile data base 70 is a general purpose database. As known to those skilled in the art, a database may be composed of records, each containing fields together with a set of operations for searching, sorting, recombining, and other functions. The customer profile database may include a variety of information for each subscriber such as a subscriber's telephone directory numbers, including business, wireless and personal numbers. The customer profile database 70 may include the subscriber's electronic mail address and a list of services subscribed to by the subscriber such as call forwarding, call waiting and voice mail, etc. The customer profile database may include other personal information such as directions to always forward calls to the subscriber at a specific number on certain days or times. Marketing and advertising information may also be included in a customer profile to be provided to callers to the subscriber.

The address book database 75 is another database that contains information on parties saved at the direction of or for the benefit of a subscriber. For example, in accordance with the present invention, a directory number obtained from directory assistance by a subscriber may then be saved in the subscriber's address book so that the subscriber does not need to use directory assistance the next time the subscriber needs that number. Other information such as a party's physical address, electronic mail address and other helpful information on the party may be saved in the address book database 75.

The directory assistance service 80 is illustrative of any local directory assistance service (provided by the subscriber's telecommunications service provider or third party or of a third party directory assistance service that may be accessed from a number telecommunications networks for obtaining a directory number for a desired called party. Some directory assistance services provide addresses for desired called parties upon request. Directory assistance services are well known to those skilled in the art.

The voice mail system 65 is shown in FIG. 1 being functionally connected to the switch 14 and is a component of the network 100. That is, calls are routed to and from the voice mail system 65 at the control and direction of the network 100 via such components as the SCP 42. The voice mail system 65 typically includes a computer or collection of computers, recording and recording playback devices, and software for recording announcements for incoming calls, recording and playing back recorded messages, and for receiving incoming calls and for making outgoing calls at the direction of the network 100. The voice mail system 65 has memory capacity for saving announcements to incoming callers and for saving messages from incoming callers. The computing system of the voicemail system 65 may send and receive electronic mail via the network 100 and the Internet 70.

A computer telephony interface 83 serves as an interface between the telephone 21 and the computer 23. Computer telephone integration, as facilitated by the computer telephony interface (CTI) 83, is a process for integration of a telephone system with a computing system. For example, the CTI 83 may be used for allowing computer applications to answer incoming calls, provide database information on a computer screen at the same time the call comes in, automatically route and reroute calls, automatically dial and speed dial outgoing calls from a computer resident database and identify incoming customer calls and transfer them to predetermined destinations based on calling party identification received on the incoming telephone call. The computer telephony interface 83 may be a software application program resident on the telephone 21.

The Internet 50 is well known to those skilled in the art as essentially a packet-switched network based on the family of protocols called Transmission Control Protocol/Internet Protocol (TCP/IP), a family of networking protocols providing communication across interconnected networks between computers with diverse hardware architectures and between various computer operating systems. Operation of the Internet 50 and the TCP/IP transmission protocols is well known to those skilled in the art.

The server 66 is a computer or collection of computers and associated memory storage. On the Internet 50 or other network, the server 66 may include a computer or software application that responds to commands from a client computer, for example the VSN 56 according to the present invention. A file server may contain an archive of data or program files. When a client computer submits a request for a file to the file server, the file server transfers a copy of the file to the client computer.

In operation, the intelligent network elements of the AIN, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP switches 12 and 14, a relatively small set of triggers are defined at the SSP switches for each call.

The message created by an SSP in response to the "firing" of a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well known to those skilled in the art and will not be further described herein. For more information regarding the AIN protocol, see Bellcore Specification GR-1298-CORE Switching Systems Generic Requirements for AIN 0.1, which is incorporated herein by reference.

The wireless network 51, such as a cellular network, comprises a mobile switching center (MSC) 52, 57. The MSC 52 is a switch providing services and coordination between wireless users in the network 51 and external networks. The MSC 52 may be connected to the STP 34 to provide information to the wireline network and receive information from the wireline network. The MSC 52 also communicates with a wireless subscriber, such as wireless telephones 53.

Operation

Figure 3:
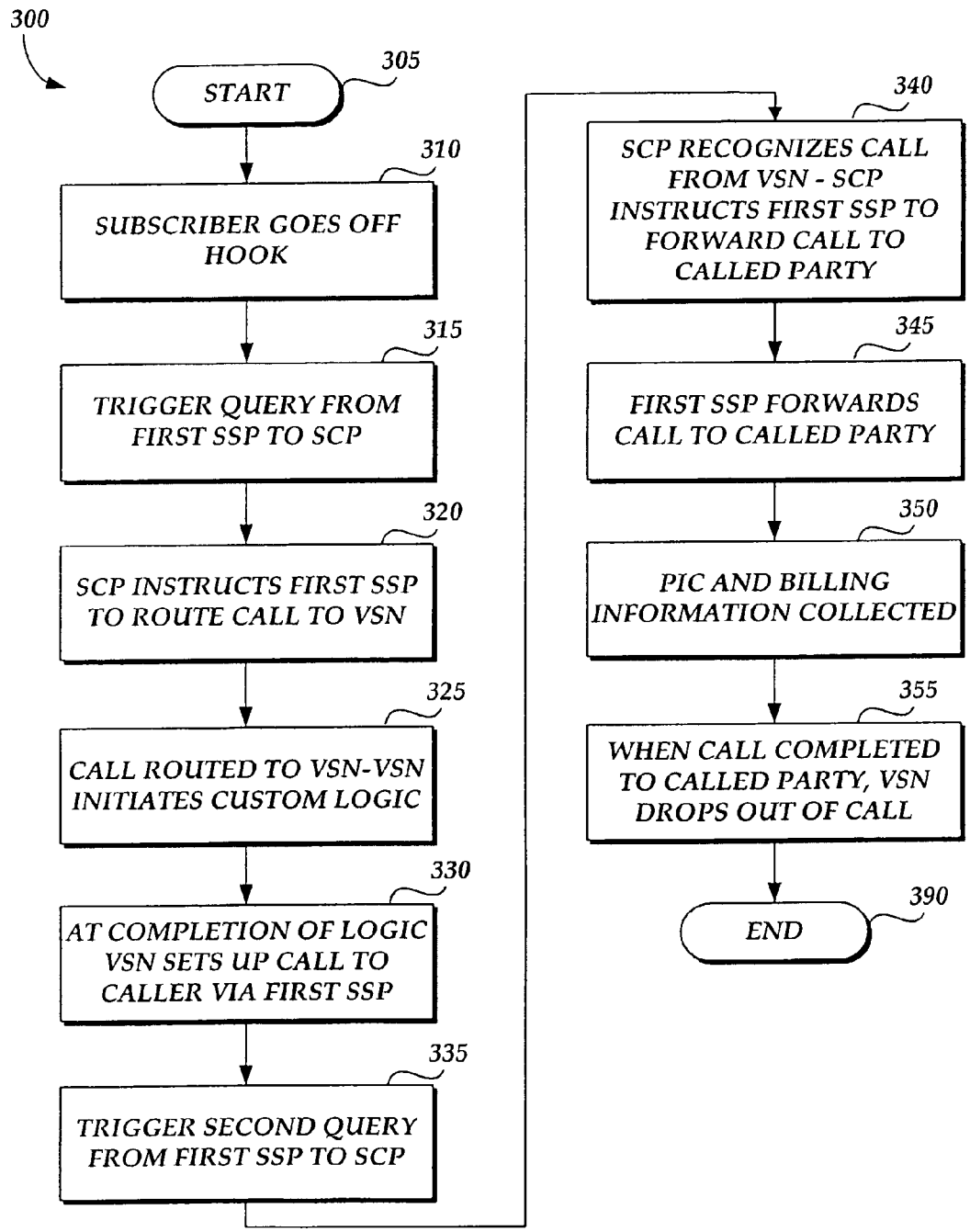
FIG. 3 illustrates a logical call flow of steps performed by a method and system of the present invention for utilization of a voice services node in general call processing.

FIG. 3 illustrates a logical call flow of steps performed by a method and system of the present invention for utilization of a voice services node 56 in general call processing. According to embodiments of the present invention, the voice services node 56 is utilized to facilitate voice interaction between a subscriber and components of the subscriber's telecommunications network and for providing other processing including database lookup and general call processing. For purposes of description, and by way of example only, FIG. 3 is described with reference to call processing steps associated with a voice activated dialing system where a subscriber may connect to a voice services node 56, speak the name of a desired called party and receive assistance from the voice services node 56 in locating a directory number associated with the desired called party and for processing a call between the subscriber and the called party. As should be understood by those skilled in the art, a number of other services may be provided by interaction between a subscriber and the voice services node 56, as described herein with reference to embodiments of the present invention.

Referring then to FIG. 3, the method 300 begins at start step 305 and proceeds to step 310 where a subscriber initiates contact with a voice services node 56 to obtain the services of the voice services node 56 in assisting the subscriber with some type of call processing, for example voice activated dialing, or some other telecommunications service available to the subscriber, for example directory assistance services. At step 310, the subscriber may initiate contact with the voice services node in a variety of manners. According to one embodiment, an off-hook delay trigger may be provisioned at the subscriber's SSP 12 so that when the subscriber takes her telephone set 21 into an off-hook configuration, the off-hook delay trigger provisioned at the SSP 12 triggers (fires) a query for initiating an interactive session with the voice services node 56. Alternatively, at step 310, the subscriber may dial using her telephone 21 a specialized dialing code associated with the desired service. For example, if voice activated dialing is desired by the subscriber, the subscriber may dial a service code, for example "*11," that will be received by the subscriber's SSP 12 which will in turn cause a query to be triggered (fired) from the SSP 12 to initiate an interactive voice session with the voice services node 56.

At step 315, a trigger provisioned at the subscriber's SSP 12 is fired causing a query to the service control point 42 for routing and processing instructions associated with the call. At step 320, the service control point 42 recognizes the query as being associated with the requested service, for example voice activated dialing service, and the service control point 42 instructs the subscriber's SSP 12 to route the call from the subscriber to the voice services node 56. At step 325, the call is received by the voice services node 56, and the voice services node 56 initiates custom logic associated with the requested service. For example, if the requested service is voice activated dialing, the voice services node 56 may provide an audio prompt to the caller such as "Who would you like to call?" Following with the present example, the subscriber (calling party) may respond with a name such as "John Doe," and the voice services node 56 converts the responsive name provided by the subscriber to a digital file using a speech recognition software module resident at the voice services node 56.

The name provided by the subscriber, "John Doe," is used by the voice services node 56 to parse an address book 75 associated with the subscriber or calling party to determine whether a directory number has been stored for the requested name. The voice services node 56 may utilize a calling line identification number associated with the telephone line from which the subscriber has called for matching the subscriber to the subscriber's personal address book 75. Alternatively, the subscriber may be required by the voice services node 56 to enter or speak a user ID and personal identification number.

If the voice services node 56 obtains a directory number associated with the requested name, call processing continues to step 330. Once processing by the voice services node according to the calling feature, for example voice activated dialing, is completed by the voice services node 56, the method continues to step 330, and the voice services node sets up a call to the subscriber via the subscriber's SSP switch 12. According to the example described herein, the voice services node 56 sets up a call ultimately between the subscriber (calling party) and the desired called party via the directory number obtained for the desired called party name.

At step 335, a trigger provisioned at the caller's switch 12 is fired by the call from the voice services node 56 back to the subscriber at the subscriber's switch 12. According to one embodiment of the present invention, the trigger provisioned at the switch 12 is a termination attempt (TAT) trigger. At step 335, the trigger fired at the SSP 12 by the call from the voice services node 56 launches a second query to the service control point 42. At step 340, the service control point 42 recognizes the call from the voice services node 56, and the service control point 42 instructs the SSP 12 to forward the call from the voice services node 56 to the called party using the directory number obtained for the called party by the voice services node 56. At step 345, the SSP 12 forwards the call from the voice services node 56 to the called party at the called party's telephone 24 through the called party's switch 14 via the public switched telephone network 31. As should be understood by those skilled in the art, at this point, a three-way communication is established between the subscriber, the voice services node 56 and the called party. At step 350, billing information, associated with the call may be collected. At step 355, when the call is completed between the subscriber and the called party, the voice services node 56 drops itself from the call leaving the subscriber in communication with the called party.

Accordingly, the voice services node 56 facilitates a voice activated dialing session where the subscriber is required to only speak the name of the party to whom she would like to be connected, and the voice services node 56 facilitates the connection by setting up a call between the subscriber and the desired called party followed by the voice services node 56 dropping itself from the call. The method ends at step 390. As should be understood, the foregoing description of FIG. 3 is described with reference to a voice activated dialing service by way of example only to illustrate the interaction between a subscriber and the voice services node 56 and to illustrate some of the capabilities of the voice services node 56 for causing call routing and to facilitate specialized services required by the subscriber.

Additional specialized features and call processing functionality provided via interaction between a subscriber and a voice services node 56 is described below with reference to FIG. 4. For further description of methods and systems for accessing and obtaining functionality from a voice services nodes 56, see U.S. patent application Ser. No. 10/029,549, filed Dec. 21, 2001, entitled "Method and System of Call Orientation Using a Service Circuit Node in an Advanced Intelligent Network" and U.S. patent application Ser. No. 10/033,627, filed Dec. 27, 2001, entitled "Method and System of Voice Activated Dialing Using an Intelligent Peripheral in Advanced Intelligent Network" both applications of which are incorporated herein by reference as if fully set out herein. Additionally, routing of calls from a subscriber or calling party to and from a voice services node 56, as described above with reference to FIG. 3 may be performed according to standard advanced intelligent network procedures and protocols which are well known to those skilled in the art.

Figure 4:
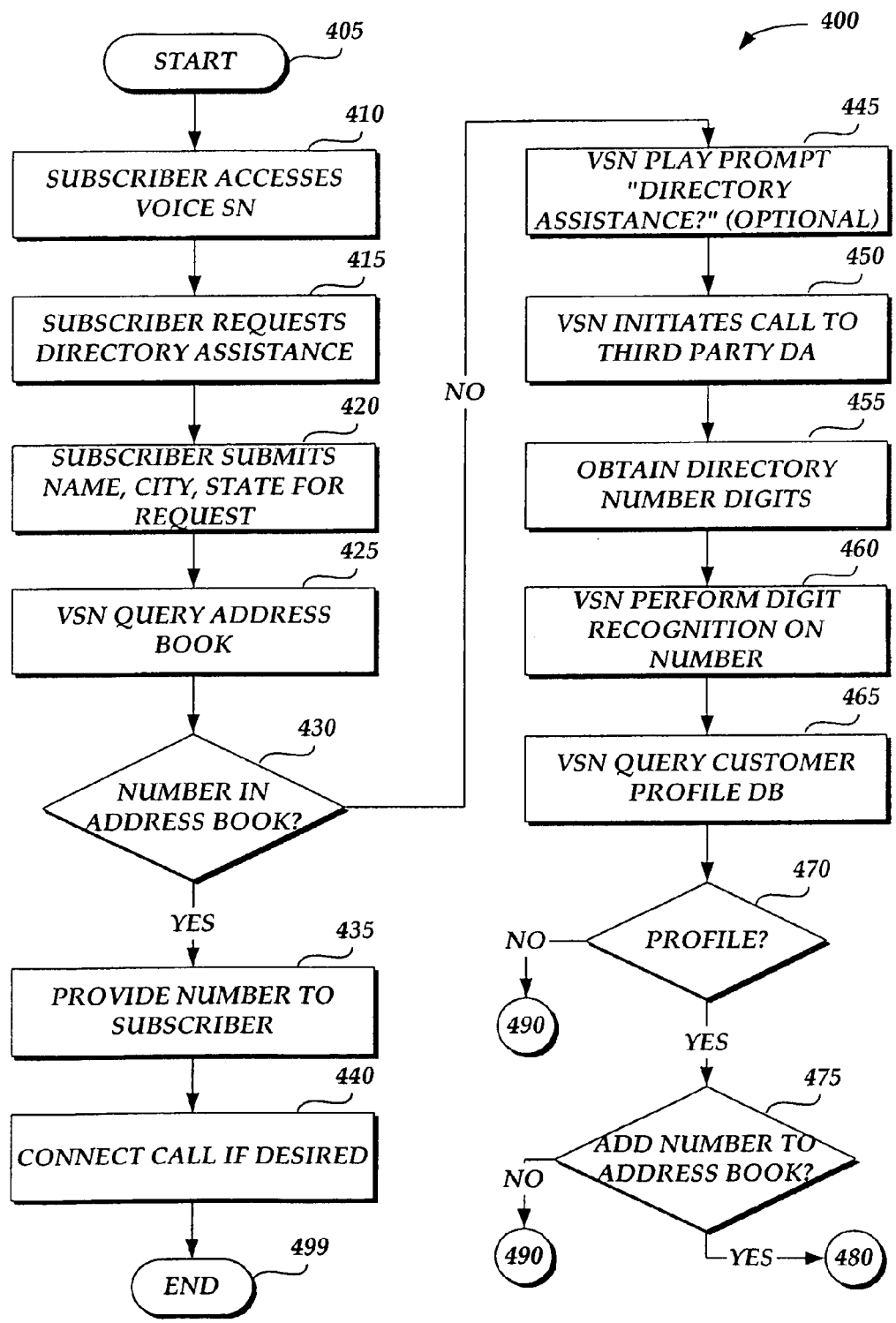
FIGS. 4 and 5 illustrate a logical call flow of steps performed by a method and system of the present invention for utilizing calling party personal calendaring and scheduling information to facilitate enhanced directory assistance information.
Figure 5:
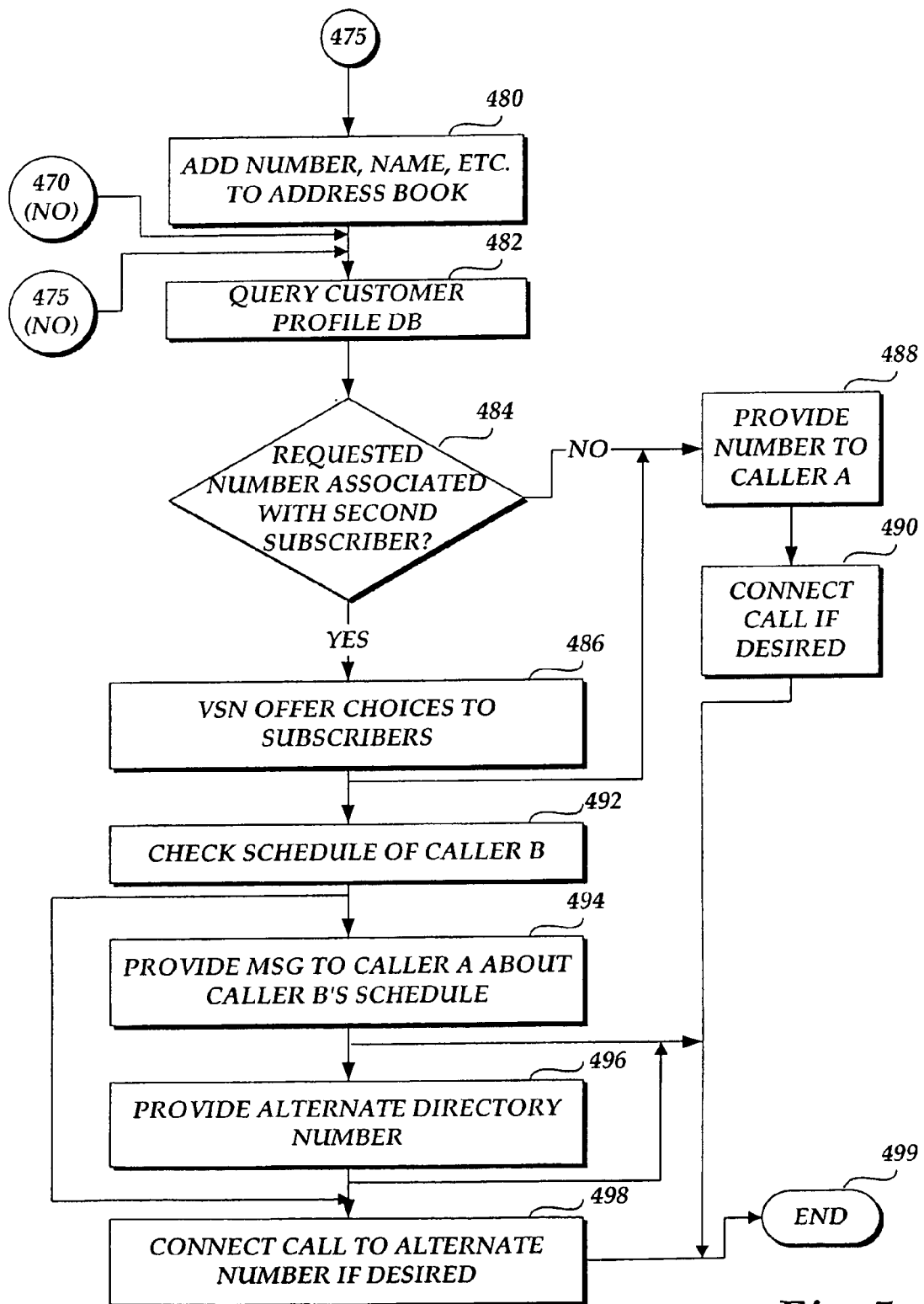

FIGS. 4 and 5 illustrate a logical call flow of steps performed by a method and system of the present invention for utilizing calling party personal calendaring and scheduling information to facilitate enhanced directory assistance information. The following description is made with reference to FIGS. 1, 2 and 3. In accordance with embodiments of the present invention, if a subscriber seeks voice activated dialing to a desired called party where a voice services node 56 obtains a directory number for the desired party from a subscriber address book, or if the subscriber obtains a directory number for a desired called party from a local or third party directory assistance services platform 80 via the services of a voice services node 56, a query may be made by the voice services node 56 to personal calendaring and scheduling information maintained by the desired called party to determine whether the called party may be reached at the directory number for the desired called party found either in the subscriber's address book or found from directory assistance services. If it is determined based on the called party's personal calendaring and scheduling information that the called party may not be reached at the obtained directory number, but instead, the called party may be reached at an alternate telephone directory number, the alternate telephone directory number is utilized for connecting the subscriber to the called party.

The method 400 begins at start step 405 and proceeds to step 410 where the subscriber accesses the voice services node 56 from the subscriber's telephone 21 as described above with reference to FIG. 3. According to the call flow illustrated in FIGS. 4 and 5, the subscriber desires connection to a called party in association with a voice activated dialing system, as described above with reference to FIG. 3. As described below, the call flow described with reference to FIGS. 4 and 5 may be utilized for voice activated dialing where the subscriber requests the dialing of a particular name and where the voice services node 56 connects the subscriber to a local or third party directory assistance service 80 if a directory number associated with the desired called party is not located in a subscriber address book 75. Alternatively, the call flow illustrated in FIGS. 4 and 5 may be utilized where the subscriber is primarily interested in directory assistance services as opposed to voice activated dialing. If the subscriber is interested in voice activated dialing, the subscriber may be connected the voice services node 56 by an off-hook delay trigger or by the dialing of a voice activated dialing entry code. Alternatively, if the subscriber is interested in going directly to a directory assistance service where the subscriber knows that the desired directory assistance number is not in the subscriber's address book 75, the subscriber may access the voice services node 56 by an off-hook delay trigger associated with directory assistance services or by the entry of a directory assistance entry code such as "*411." It should be understood by those skilled in the art, the subscriber may place a call to the voice services node 56 for obtaining the functionality of the present invention from the subscriber's wireless telephone 53 or wireless device 58 over the wireless network 51 to the voice services node 56.

At step 415, the voice services node 56 may prompt the subscriber to receive the subscriber's request. For example, the voice services node 56 may provide a prompt such as "How can I help you?" to which the subscriber may respond "directory assistance please." Alternatively, if the subscriber has accessed the voice services node 56 for voice activated dialing services, the voice services node 56 may provide a prompt such as "Who would you like to call?" Accordingly, the subscriber may respond with a name such as "John Doe," as described above with reference to FIG. 3. At step 420, the name and address, if required, are received from the subscriber by the voice services node 56. The speech recognition module at the voice services node 56 converts the spoken name and/or address provided by the subscriber to a digital file such as a WAV file that may be used to parse the subscriber's address book 75 to determine whether the name and associated directory number are stored in the subscriber's address book 75.

At step 425, the voice services node 56 queries the address book 75 for an address book memory location associated with the subscriber. According to one embodiment, the voice services node 56 may query the address book 75 using the calling line identification (CLID) associated with the telephone line from which the subscriber's call to the voice services node 56 is placed. Alternatively, the voice services node 56 may prompt the subscriber for a user identification and/or personal identification number to authenticate the subscriber and to query the address book 75 for the subscriber's personal address book.

At step 430, a determination is made as to whether the address book database 75 contains a personal address book location for the subscriber. If the subscriber has an address book at the address book database 75, a database query is presented to the address book of the subscriber to determine whether the name and/or address provided by the subscriber has been stored along with an associated directory number. If the address book 75 contains a memory location for the subscriber, and if a directory number is obtained by the voice services node associated with the name and/or address provided by the subscriber, the directory number is returned to the voice services node 56. At step 435, the voice services node 56 may play the directory number to the subscriber, if desired, or the method may proceed to step 440 and the voice services node may automatically connect the subscriber to the called party, as described above with reference to FIG. 3.

Returning back to step 430, if the address book DB 75 contains no address book memory location for the subscriber, or if the subscriber has an address book memory location, but the desired number is not located in the address book by the voice services node 56, the method proceeds to step 435 where the voice services node 56 initiates a connection between the subscriber and a local or third party directory assistance service platform 80. As described below, the VSN 56 may query the customer profile DB 70 for a profile for the subscriber (calling party) to determine whether the subscriber has a personal address book in the address book DB 75. Prior to connecting the subscriber to the directory assistance platform 80, the voice services node 56 may provide a prompt to the subscriber asking the subscriber if he/she would like to register with the telecommunications service provider to create an address book memory location at the address book DB 75 for future use.

If the subscriber has established an address book for maintaining address data for the subscriber, the voice services node 56 may provide a prompt to the subscriber such as "Your address book contains no directory number for the desired calling party, would you like to be connected to directory assistance?" If the subscriber wishes to be connected to directory assistance services, the method proceeds to step 450 and the voice services node initiates a call to the local or third party directory assistance services platform 80. Alternatively, when the voice services node 56 determines that no address book is available for the subscriber or that a directory number associated with the desired called party is not available in the subscriber's address book, the voice services node 56 may automatically connect the subscriber to the directory assistance services platform 80 to obtain directory assistance services for the subscriber.

At step 450, the voice services node 56 initiates a call between the subscriber and the directory assistance services platform 80 just as would be done if the subscriber had directly called the directory assistance services. In order to connect the call between the subscriber and the directory assistance services platform 80, the voice services node bridges a call between the subscriber and directory assistance in the same manner as the voice services node connected a call between the subscriber and the called party as described above with reference to FIG. 3. According to an embodiment of the present invention, however, the voice services node 56 remains connected in the call between the subscriber and the directory assistance services platform 80. When the subscriber hears a prompt from the directory assistance service such as "Name, city and state please," the voice services node 56 records the subscriber's response. That is, if the subscriber responds "John Doe, Atlanta, Ga.," the voice services node 56 records that information and the speech recognition module of the voice services node 56 converts that information to a digital file, such as a WAV file, for subsequent use. At step 455, when the directory assistance services platform 80 responds to the subscriber's request with a directory number associated with the requested called party, the voice services node captures the digits provided by the directory assistance service and converts those digits to a digital file.

At step 460, the voice services node performs digit recognition on the number provided by the directory assistance services platform 80 to determine whether an appropriate directory number has been received for subsequent use. At step 465, the voice services node 56 queries the customer profile database 70 to determine whether the subscriber has a customer profile established in a customer profile database 70 containing services information subscribed to by the subscriber. If not, the method proceeds to step 482 for call processing, as described below. If the subscriber has customer profile information indicating the presence of an address book memory location for the subscriber in the address book 75.

As should be understood by those skilled in the art, if it was determined at step 430 that the subscriber did not have an address book 75, the subscriber may have followed a prompt from the voice services node 56 to establish an address book memory location at the address book DB 75 at which time customer profile data would be obtained for the subscriber and populated in the customer profile database 70 along with the establishment of an address book memory location associated with the subscriber in the address book 75. If it was established at step 430 that the subscriber has an address book memory location at the address book 75, the method may proceed directly from step 465 to step 475. Alternatively, if it is determined at step 470 that the subscriber now has an address book memory location at the address book 75, the method proceeds to step 475.

At step 475, the voice services node 56 may prompt the subscriber to determine whether the subscriber would like to add the obtained directory number recorded by the voice services node 56 from the directory assistance service platform 80 into the subscriber's address book 75. According to one embodiment of the present invention, the voice services node 56 may read back the information to the subscriber, for example "John Doe, 404-555-1212," followed by a prompt such as "Would you like to add this directory number to your address book for future use?" If the subscriber does not wish to add the number to his/her address book 75, the method proceeds to step 482 for call processing as described below. If the subscriber desires to add the newly obtained directory number to the subscriber's address book 75, the method proceeds to step 480, FIG. 5, and the voice services node 56 populates the subscriber's address book 75 with the obtained name and associated directory number information.

At step 482, the voice services node 56 queries the customer profile database 70 to determine whether a customer profile is contained in the database 70 associated with the obtained directory number. At step 484, a determination is made as to whether the obtained directory number is associated with a second subscriber having a customer profile maintained at the customer profile database 70. If not, the method may proceed to step 488, and the obtained directory number may be provided to the subscriber. At step 490, the call may be connected between the subscriber and the called party at the obtained directory number via the services of the voice services node 56, as described above with reference to FIG. 3. Alternatively, the obtained number may not be provided to the subscriber, but the method may proceed directly to step 490 where the call is automatically connected to the called party at the obtained directory number, as described above with reference to FIG. 3.

If at step 484, a customer profile is found in the customer profile database 70 associated with the obtained directory number and associated with a second subscriber who has previously established a profile of telecommunications services and related information in the database 70, the method proceeds to step 486 and the voice services node 56 offers a variety of choices to the calling subscriber. If the subscriber declines any services provided by the voice services node 56 at step 486, the method proceeds to step 488, and the call is processed as described above.

At step 492, the voice services node 56 may check the personal scheduling and calendaring information for the called party (second subscriber) to determine whether the called party is currently located at a location associated with the obtained directory number. According to embodiments of the present invention, the second subscriber may update his personal calendaring and scheduling information maintained in his customer profile in the customer profile database 70. According to one embodiment of the present invention, the subscriber may update information contained in his customer profile via his computer 23 or wireless personal digital assistant device 58 via the Internet 50. Alternatively, the second subscriber or called party may update information contained in his customer profile by telephoning the voice services node 56 from his wireline telephone 21, 24 via the public switched telephone network 31 or from his wireless telephone or wireless device 53, 58, 59 via the wireless network 51. Once the called party (second subscriber) accesses his customer profile maintained at the customer profile database 70, the called party may enter calendaring information including his location and alternate telephone directory numbers for reaching the subscriber at different dates and times. For example, the called party may enter into his personal calendaring and scheduling information that on Feb. 1, 2003, he will be on vacation and may be reached at a prescribed alternate telephone directory number.

According to an embodiment of the present invention, the alternate location and alternate telephone directory number may be entered into a data field that may be parsed by the voice services node 56 for use in association with the embodiments of the present invention. Alternatively, the subscriber may utilize a personal calendaring and scheduling system such as Outlook®, manufactured by Microsoft Corporation of Redmond, Washington, whereby the subscriber may synchronize the personal calendaring and scheduling software application with his customer profile maintained at the customer profile database 70. According to this embodiment of the present invention, a software application module may be resident on the subscriber's local computer 23 or personal digital assistant 58, or alternatively at the customer profile database 70, for extracting an alternative location and alternative telephone directory number from the subscriber's personal calendaring and scheduling application and for placing that data in an appropriate field in the second subscriber's customer profile in the database 70 that may be parsed by the voice services node 56, as described above.

If at step 492, the voice services node 56 determines that no alternate telephone directory number is provided in the second subscriber's customer profile for the present date and time, the method may proceed back to step 488 where the call is processed using the directory number obtained in accordance with steps 410 through 460, described above. However, if at step 492 the voice services node locates an alternate directory number from the called party's (second subscriber) personal schedule and calendaring information contained in the called party's customer profile, the method may proceed directly to step 498 and the voice services node 56 will connect the subscriber to the called party at the alternate directory number, in the same manner as described above with reference to FIG. 3. Alternatively, the method may proceed to step 494, and the voice services node 56 may provide a message to the subscriber (calling party) to alert the subscriber of the called party's schedule and alternate directory number. For example, the voice services node may convert information contained in the customer profile of the called party from text-to-speech and provide an audio message to the subscriber (calling party) such as "The called party is presently on vacation and may be reached at alternate telephone directory number 404-555-1212." If the subscriber or called party so desires, the call may be terminated at this time and the subscriber may place a separate call to the called party at the provided alternate directory number. Otherwise, if the subscriber would rather not call the called party at the alternate directory number, the subscriber may terminate call processing at this point. If the subscriber chooses to have the call connected by the voice services node 56 to the called party at the alternate directory number, the method proceeds to step 498 and the call is connected to the called party, as described above with reference to FIG. 3.

As described herein, methods and system are provided for utilizing called party personal calendaring and scheduling information to facilitate enhanced directory assistance information. That is, prior to connecting a calling party directly to a called party, or prior to providing an obtained directory number to a calling party, a determination is made based on the personal calendaring and scheduling information provided by the called party as to whether the called party must be reached at an alternate telephone directory number. If so, the alternate telephone directory number may be provided to the calling party, or the calling party may be automatically connected to the called party via the alternate telephone directory number. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for utilizing personal calendaring information of a called party for directing a call to the called party, comprising:
    receiving a request to connect the call to a called party;
    querying a calling party address book for a directory number associated with the called party;
    querying a personal scheduling calendar of the called party;
    determining whether the called party may be reached at the present date and time at a second directory number different from a directory number for the called party returned from the calling party address book; and
    if the called party may be reached at the present date and time at the second directory number different from the directory number for the called party returned from the calling party address book, adding the second directory number to the calling party address book.

2. The method of claim 1, further comprising connecting the call between the calling party and the called party via the second directory number.

3. The method of claim 1, whereby querying the personal scheduling calendar of the called party includes querying a customer profile database to determine whether the called party has established a customer profile.

4. The method of claim 3, whereby the step of querying the customer profile database to determine whether the called party has established the customer profile includes passing a database query to the customer profile database.

5. The method of claim 4, whereby passing the database query to the customer profile database includes passing with the database query the directory number returned from the calling party address book.

6. The method of claim 5, further comprising using the directory number returned from the calling party address book to parse the customer profile database for the customer profile associated with the called party.

7. The method of claim 6, further comprising: determining whether the customer profile for the called party has a personal scheduling calendar for the called party; and if the customer profile for the called party has the personal scheduling calendar for the called party, locating a present date and time position in the personal scheduling calendar.

8. The method of claim 7, further comprising determining whether the present date and time position in the personal scheduling calendar includes the second directory number for the called party.

9. The method of claim 1, further comprising notifying the calling party that the called party may be reached at the second directory number.

10. The method of claim 9, further comprising playing an audio-formatted message to the calling party including the second directory number.

11. The method of claim 9, prior to notifying the calling party that the called party may be reached at the second directory number, converting the second directory number from a text to speech message for playing the calling party.

12. The method of claim 3, further comprising accessing the called party customer profile in the customer profile database to update the called party personal scheduling calendar with alternate directory numbers for one or more date and time positions in the personal scheduling calendar.

13. The method of claim 12, whereby accessing the called party customer profile in the customer profile database includes accessing the customer profile database telephonically by the called party.

14. The method of claim 12, whereby accessing the called party customer profile in the customer profile database includes accessing the customer profile database by the called party via a distributed computing network.

15. The method of claim 14, whereby accessing the customer profile database by the called party via the distributed computing network includes accessing the customer profile database via the Internet.

16. The method of claim 15, whereby accessing the customer profile database via the Internet includes accessing the customer profile database using a TCP/IP protocol connection from a called party-computing device to the customer profile database.

17. The method of claim 14, after accessing the customer profile database by the called party via the distributed computing network, downloading a second called party personal scheduling calendar to the called party personal scheduling calendar in the called party customer profile.

18. A method for obtaining directory assistance information and for storing the obtained directory assistance information in a subscriber address book, comprising:
    triggering a query from a calling party switch for call routing instructions;
    receiving a request to connect a call to a called party;
    querying a calling party address book for a directory number associated with the called party;
    if the directory number associated with the called party is not located in the calling party address book, connecting the calling party to a directory assistance service for obtaining the directory number for the called party;
    querying a personal scheduling calendar of the called party;
    determining whether the called party may be reached at the present date and time at a second directory number different from the directory number for the called party obtained from the directory assistance service; and if the called party may be reached at the present date and time at the second directory number different from the directory number for the called party obtained from the directory assistance service, adding the second directory number to the calling party address book.

19. The method of claim 18, after forwarding the request to route the call to the second directory number, connecting a call between the calling party and the called party via the second directory number.

20. The method of claim 18, whereby querying the personal scheduling calendar of the called party includes querying a customer profile database to determine whether the called party has established a customer profile.

21. The method of claim 20, whereby the step of querying the customer profile database to determine whether the called party has established the customer profile includes passing a database query to the customer profile database.

22. The method of claim 21, whereby passing the database query to the customer profile database includes passing with the database query the directory number obtained from the directory assistance service.

23. The method of claim 22, further comprising using the directory number obtained from the directory assistance service to parse the customer profile database for the customer profile associated with the called party.

24. The method of claim 23, further comprising:
determining whether the customer profile for the called party has the personal scheduling calendar for the called party; and
if the customer profile for the called party has the personal scheduling calendar for the called party, locating a present date and time position in the personal scheduling calendar.

25. The method of claim 24, further comprising determining whether the present date and time position in the personal scheduling calendar includes the second directory number for the called party.

26. The method of claim 18, further comprising notifying the calling party that the called party may be reached at the second directory number.

27. The method of claim 26, further comprising playing an audio-formatted message to the calling party including the second directory number.

28. The method of claim 27, prior to notifying the calling party that the called party may be reached at the second directory number, converting the second directory number from a text to speech message for playing the calling party.

29. The method of claim 20, further comprising accessing the called party customer profile in the customer profile database to update the called party personal scheduling calendar with alternate directory numbers for one or more date and time positions in the personal scheduling calendar.

30. The method of claim 29, whereby accessing the called party customer profile in the customer profile database includes accessing the customer profile database telephonically by the called party.

31. The method of claim 29, whereby accessing the called party customer profile in the customer profile database includes accessing the customer profile database by the called party via a distributed computing network.

32. The method of claim 31, whereby accessing the customer profile database by the called party via the distributed computing network includes accessing the customer profile database via the Internet.

33. The method of claim 32, whereby accessing the customer profile database via the Internet includes accessing the customer profile database using a TCP/IP protocol connection from a called party-computing device to the customer profile database.

34. The method of claim 31, after accessing the customer profile database by the called party via the distributed computing network, downloading a second called party personal scheduling calendar to the called party personal scheduling calendar in the called party customer profile.

35. A method for utilizing personal calendaring information of a called party for directing a call to the called party, comprising:
receiving a request to connect a call to a called party;
querying a calling party address book for a directory number associated with the called party;
querying a personal scheduling calendar of the called party;
determining whether the called party may be reached at the present date and time at a second directory number different from the directory number for the called party returned from the calling party address book;
if the called party may be reached at the present date and time at the second directory number different from the directory number for the called party returned from the calling party address book, receiving the second directory number; and
adding the second directory number to the calling party address book.

36. The method of claim 35,
whereby querying the personal scheduling calendar of the called party includes querying a customer profile at a customer profile database and determining whether the customer profile for the called party has the personal scheduling calendar for the called party; and
whereby determining whether the called party may be reached at the present date and time at the second directory number different from the directory number for the called party returned from the calling party address book includes locating a present date and time position in the personal scheduling calendar, and determining whether the present date and time position in the personal scheduling calendar includes the second directory number for the called party.

37. The method of claim 36, further comprising notifying the calling party that the called party may be reached at the second directory number.

38. A telecommunications system voice services node for utilizing personal calendaring information of a called party to direct a call to the called party, wherein the voice services node is operative to:
receive a request to connect the call to a called party;
query a calling party address book for a directory number associated with the called party;
query a personal scheduling calendar of the called party;
determine whether the called party may be reached at a present date and time at a second directory number different from the directory number for the called party returned from the calling party address book;
receive the second directory number from a called party customer profile; and
add the second directory number to the calling party address book.

39. The voice services node of claim 38, further operative to query a customer profile database to determine whether the called party has established a customer profile.

40. The voice services node of claim 39, further operative to pass a database query to the customer profile database to determine whether the called party has established the customer profile.

41. The voice services node of claim 40, further operative to pass with the database query the directory number returned from the calling party address book for parsing the customer profile database for the customer profile associated with the called party.

42. The voice services node of claim 41, further operative to:

determine whether the customer profile for the called party has the personal scheduling calendar for the called party; and locate a present date and time position in the personal scheduling calendar if the customer profile for the called party has the personal scheduling calendar for the called party.

43. The voice services node of claim 42, further operative to determine whether the present date and time position in the personal scheduling calendar includes the second directory number for the called party.

44. The voice services node of claim 38, further operative to notify the calling party that the called party may be reached at the second directory number.

45. The voice services node of claim 44, further operative to play an audio-formatted message to the calling party including the second directory number.

46. The voice services node of claim 45, further operative to convert the second directory number from a text to speech message for playing the calling party prior to notifying the calling party that the called party may be reached at the second directory number.

47. The voice services node of claim 38, whereby the voice services node is further operative to:

receive updates to the personal scheduling calendar of the called party including alternate directory numbers for one or more date and time positions in the personal scheduling calendar of the called party; and pass updates to the personal scheduling calendar of the called party to a customer profile database for entry into the called party customer profile.

48. A computer program product comprising a computer-readable medium having control logic stored therein for causing a computer to utilize personal calendaring information of a called party for directing a call to the called party, the control logic comprising computer-readable program code for causing the computer to:

receive a request to connect the call to the called party;

query a calling party address book for a directory number associated with the called party;

query a personal scheduling calendar of the called party;

determine whether the called party may be reached at a present date and time at a second directory number different from the directory number for the called party returned from the calling party address book; and if the called party may be reached at the present date and time at the second directory number different from the directory for the called party returned from the calling party address book, add the second directory number to the calling party address book.

49. The computer program product of claim 48, further comprising computer-readable program code for causing the computer to connect the call between the calling party and the called party via the second directory number.

50. The computer program product of claim 48, whereby the computer-readable program code for causing the computer to query the personal scheduling calendar of the called party includes computer-readable program code for causing the computer to query a customer profile database to determine whether the called party has established a customer profile.

* * * * *